(12) United States Patent
Kim et al.

(10) Patent No.: US 9,529,441 B2
(45) Date of Patent: Dec. 27, 2016

(54) DISPLAY APPARATUS

(71) Applicant: SAMSUNG ELECTRONICS CO., LTD., Suwon (KR)

(72) Inventors: Hak-young Kim, Yongin (KR); Go-hyun Kim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 287 days.

(21) Appl. No.: 14/135,786

(22) Filed: Dec. 20, 2013

(65) Prior Publication Data
US 2014/0232865 A1 Aug. 21, 2014

(30) Foreign Application Priority Data

Feb. 18, 2013 (KR) ........................ 10-2013-0017118

(51) Int. Cl.
| | |
|---|---|
| *H04N 7/18* | (2006.01) |
| *G06F 3/01* | (2006.01) |
| *H04N 5/64* | (2006.01) |
| *H04N 5/225* | (2006.01) |
| *H04N 5/44* | (2011.01) |
| *H04N 21/4223* | (2011.01) |
| *H04N 21/442* | (2011.01) |

(52) U.S. Cl.
CPC ............ *G06F 3/017* (2013.01); *H04N 5/2257* (2013.01); *H04N 5/4403* (2013.01); *H04N 5/64* (2013.01); *H04N 21/4223* (2013.01); *H04N 21/44218* (2013.01)

(58) Field of Classification Search
CPC ........................................................ G06F 3/017
USPC ........................................................ 348/143
See application file for complete search history.

(56) References Cited

U.S. PATENT DOCUMENTS

| | | | | |
|---|---|---|---|---|
| 2007/0001071 A1* | 1/2007 | Yeh | .................. | F16M 13/02 248/179.1 |
| 2007/0253703 A1* | 11/2007 | Tsai | .................. | G03B 17/02 396/429 |

(Continued)

FOREIGN PATENT DOCUMENTS

| | | |
|---|---|---|
| KR | 10-2000-0020511 | 4/2000 |
| KR | 10-2007-0080063 | 8/2007 |

(Continued)

OTHER PUBLICATIONS

Partial European Search Report dated May 19, 2014 in corresponding European Patent Application No. 14152348.0.

(Continued)

*Primary Examiner* — Richard Torrente
(74) *Attorney, Agent, or Firm* — Staas & Halsey LLP

(57) ABSTRACT

A display apparatus that provides user interactions is provided, which includes a display main body configured to have an image display surface; and a photographing unit configured to include a camera module that photographs a user to sense a user's gesture, the photographing unit being arranged at a first position where the photographing unit is accommodated in the display main body during non-photographing and being arranged at a second position where the photographing unit projects out of the display main body during photographing, where the camera module is arranged closer to the image display surface if the photographing unit is at the second position rather than at the first position.

19 Claims, 16 Drawing Sheets

(56) References Cited

U.S. PATENT DOCUMENTS

2008/0266401 A1    10/2008   Fry et al.
2011/0157009 A1    6/2011   Kim et al.
2012/0127257 A1    5/2012   Lu et al.
2012/0127362 A1    5/2012   Chang

FOREIGN PATENT DOCUMENTS

KR        10-0788865      12/2007
KR   10-2011-0076458      7/2011
KR        2012/115307      8/2012

OTHER PUBLICATIONS

PCT International Search Report and Written Opinion of the International Searching Authority mailed Apr. 3, 2014 in corresponding International Patent Application No. PCT/KR2013/011513.
Extended European Search Report dated Oct. 6, 2014 in corresponding European Patent Application No. 14152348.0.

\* cited by examiner

DISPLAY APPARATUS

CROSS REFERENCE TO RELATED APPLICATION

This application claims priority under 35 U.S.C. §119(a) to Korean Patent Application No. 10-2013-0017118, filed on Feb. 18, 2013, in the Korean Intellectual Property Office, the disclosure of which is incorporated herein by reference.

BACKGROUND

1. Field

The present disclosure relates to a display apparatus, and more particularly to a display apparatus and method that provides user interaction.

2. Description of the Related Art

Recently, with the expansion of smart interactive functions, display devices that provide user interactions have appeared. The user interaction is to control the display device with user's motion or voice. Accordingly, a photographing unit for sensing user's motion or a voice sensing unit for sensing user's voice is essentially mounted on the display device.

The photographing unit or the voice sensing unit is fixedly mounted at an upper end of a display device in the related art. According to such a display device, however, the upper end portion thereof always projects outward due to the mount of the photographing unit or the voice sensing unit, and this spoils the beauty of the display device. Further, due to the exposed photographing unit or voice sensing unit, a user may feel like the user is always being watched, and this may give the user an unpleasant feeling.

To solve this problem, the photographing unit and the voice sensing unit may be silidably mounted on an upper portion of the rear surface of the display device to slide upward and downward so that the photographing unit and the voice sensing unit are unable to be seen by the user when they are not in use. For example, the photographing unit may project upward from the upper portion of the rear surface of the display device during photographing, and the projecting photographing unit may slide downward and may not be seen from the front of the display device during non-photographing. The photographing unit and the voice sensing unit as described above are positioned behind the display device as far as the thickness of the side portion of the display device from the front surface of the display device. Accordingly, in order to secure a large camera viewing angle, it is essentially required to make the photographing unit project further upward, and this may spoil the beauty of the display device.

SUMMARY

Additional aspects and/or advantages will be set forth in part in the description which follows and, in part, will be apparent from the description, or may be learned by practice of the embodiments.

Accordingly, an aspect of the present disclosure provides a display apparatus that can secure a large camera viewing angle without spoiling the beauty of the display apparatus.

According to one aspect of the present disclosure, a display apparatus that provides user interactions includes a display main body configured to have an image display surface; and a photographing unit configured to include a camera module that photographs a user to sense a user's gesture, the photographing unit being arranged at a first position where the photographing unit is accommodated in the display main body during non-photographing and being arranged at a second position where the photographing unit projects out of the display main body during photographing, wherein the camera module is arranged closer to the image display surface if the photographing unit is at the second position rather than at the first position.

The camera module may be arranged to gaze at an upper side of or at an upper plane parallel to the display main body when the photographing unit is at the first position and may be arranged to gaze at a front side of or at a front plane parallel to the display main body when the photographing unit is at the second position image capture.

The photographing unit may move from the first position to the second position or from the second position to the first position through sliding to follow a curved trace or curve in a rotation like motion.

The photographing unit may further include a camera casing having a shape corresponding to the curved trace and including a pair of slide guide grooves that are spaced apart from each other for a predetermined distance, and the display main body may include a main casing configured to accommodate a display panel; and an auxiliary casing mounted on a rear surface of the main casing to accommodate the photographing unit arranged at the first position and provided with a pair of guide projections inserted into the pair of slide guide grooves to guide sliding of the camera casing.

The display apparatus according to the aspect of the present disclosure may further include a locking unit configured to lock the photographing unit arranged at the first position in the auxiliary casing.

The locking unit may include a latch unit connected to the photographing unit; and a locking member provided in the auxiliary casing to lock the photographing unit through engagement with the latch unit when the photographing unit is arranged at the first position.

The latch unit may include a latch housing; and a pair of hook members configured to be movable between an exposure position for being exposed out of the latch housing and a partial insertion position for being partially inserted into the latch housing, wherein when the photographing unit moves from the second position to the first position, the pair of hook members move from the exposure position to the partial insertion position to be hook-engaged with the locking members, and when the photographing unit moves from the first position to the second position, the pair of hook members move from the partial insertion position to the exposure position to be separated from the locking members.

The locking member may include a main body portion extending vertically from the auxiliary casing; and an engagement portion provided at a front end of the main body portion to be engaged with the pair of hook members, wherein the pair of hook members get elastically closer to each other to hook in the engagement portion when moving from the exposure position to the partial insertion position, and are elastically spaced apart from each other to be separated from the engagement portion when moving from the partial insertion position to the exposure position.

The camera casing may include a base casing having the camera module mounted thereon and the pair of slide guide grooves formed thereon; and a cover casing configured to cover the base casing.

The base casing may be formed of an aluminum material.

The display apparatus according to the aspect of the present disclosure may further include a slider having the latch unit mounted thereon and configured to be engaged with the photographing unit, wherein the slider slides downward to hook-engage the lock member with the hook member when the photographing unit moves from the second position to the first position, and if the hook member and the lock member are separated from each other, the slider slides upward to move the photographing unit from the first position to the second position.

The display apparatus according to the aspect of the present disclosure may further include a pair of guide rails provided on both sides of the slider to guide sliding of the slider.

The display apparatus according to the aspect of the present disclosure may further include an elastic member configured to press the slider upward when the hook member and the locking member are separated from each other.

The elastic member may be a torsion bar spring.

The display apparatus according to the aspect of the present disclosure may further include a damping member mounted on the slider to adjust a sliding speed of the slider.

The damping member may be provided as a rotating damper that is engaged with a damper rail provided on the guide rail to be rotated.

The photographing unit may further include a tilt lever configured to adjust a tilt of the camera module.

The display apparatus according to the aspect of the present disclosure may further include at least one voice sensing unit mounted inside the display main body to sense a user's voice.

The at least one voice sensing unit may be mounted adjacent to an upper surface of the display main body and may be provided on both sides of the photographing unit.

The display apparatus may be a television set.

As described above, according to the display apparatus according to various embodiments of the present disclosure, a large camera viewing angle can be secured without spoiling the beauty of the display apparatus.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION OF EMBODIMENTS

Figure 1:
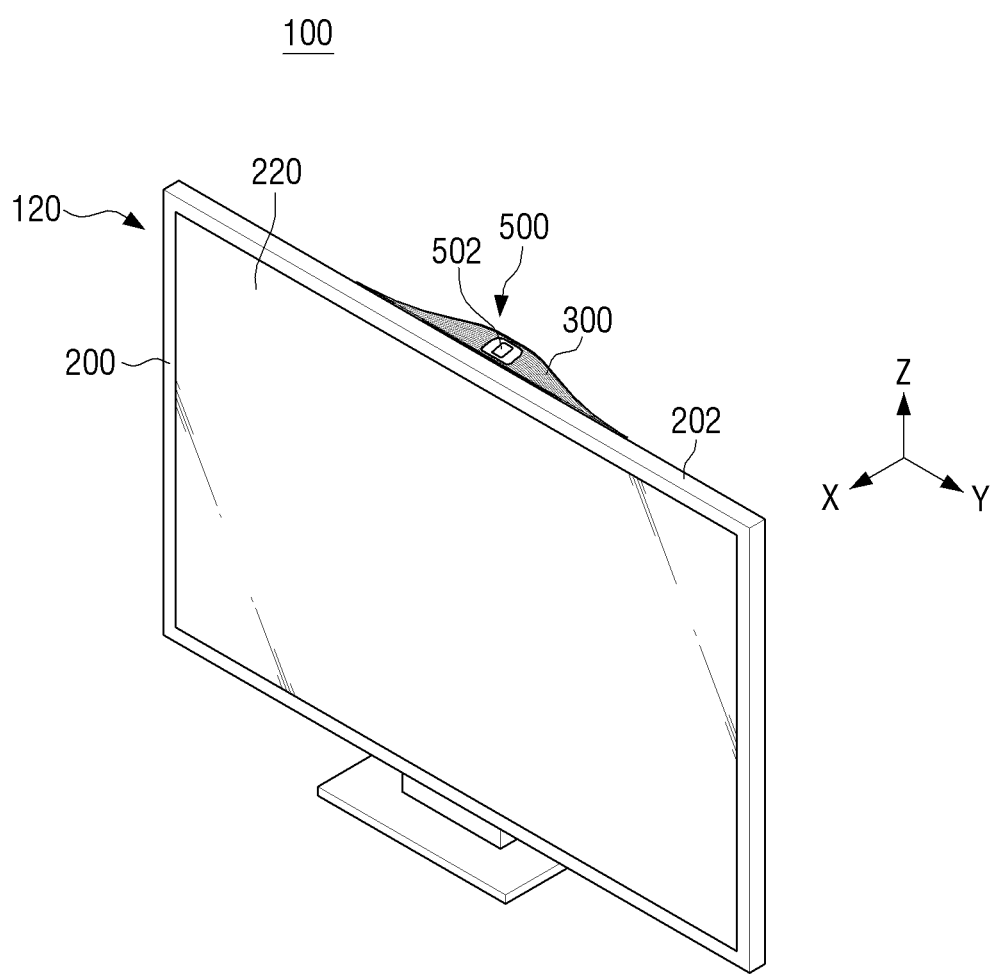
FIGS. 1 and 2 are perspective views illustrating a display apparatus according to an embodiment of the disclosure.

Reference will now be made in detail to the embodiments, examples of which are illustrated in the accompanying drawings, wherein like reference numerals refer to the like elements throughout. The embodiments are described below to explain the embodiments by referring to the figures.

Figure 2:
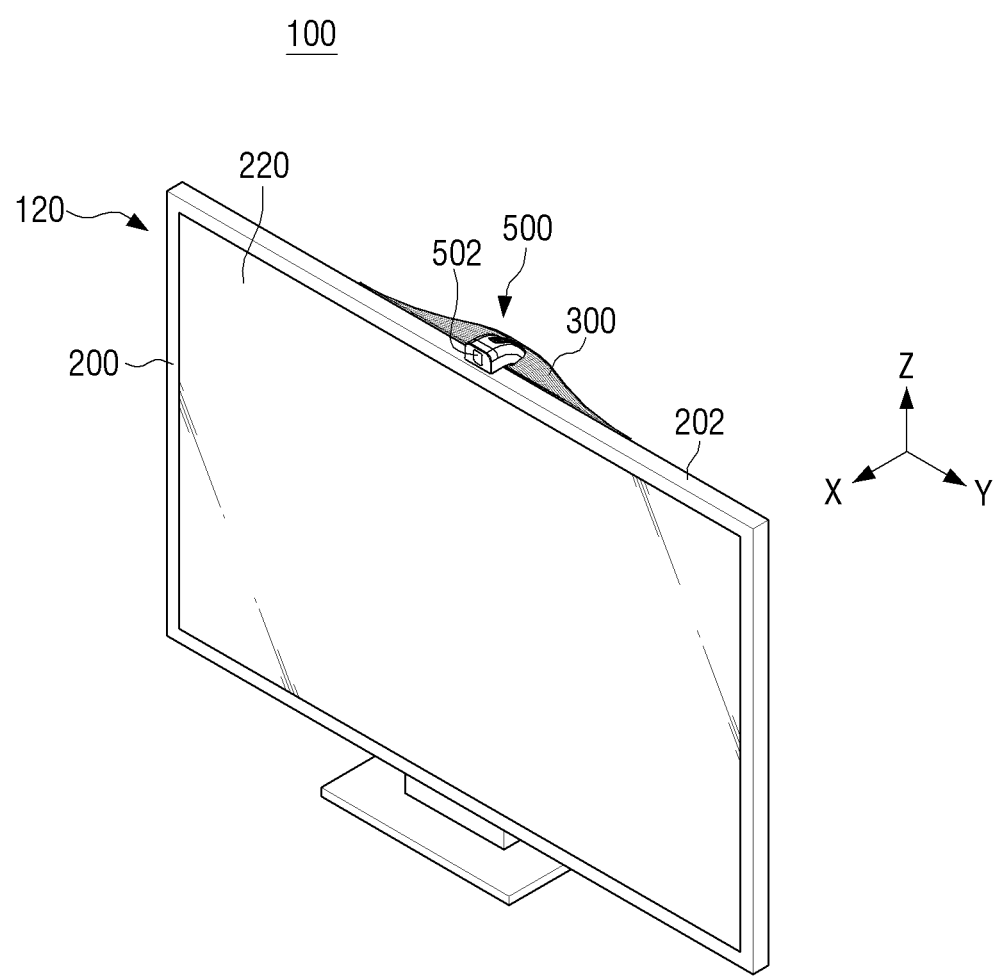
Figure 3:
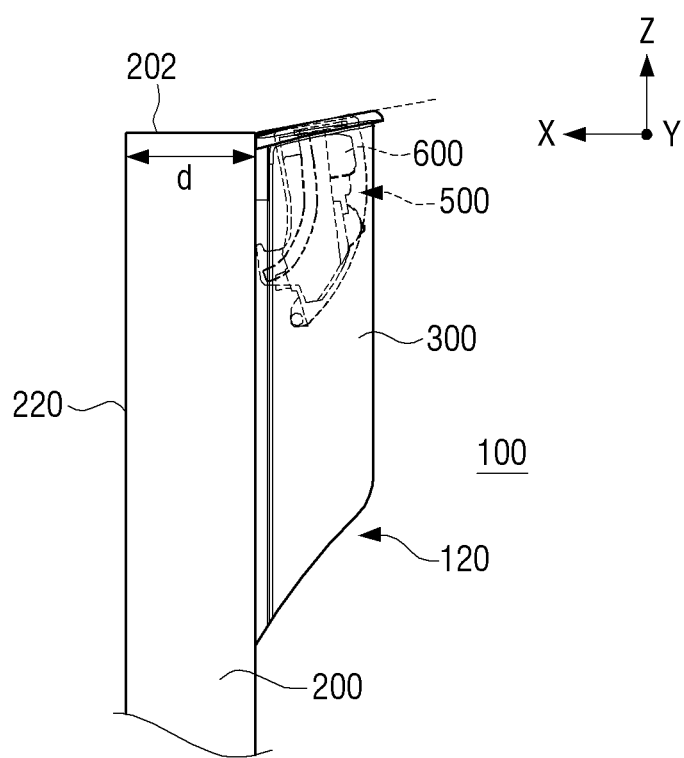
FIG. 3 is a cross-sectional view illustrating a photographing unit provided on the display apparatus of FIG. 1 when the photographing unit is arranged at a first position.
Figure 4:
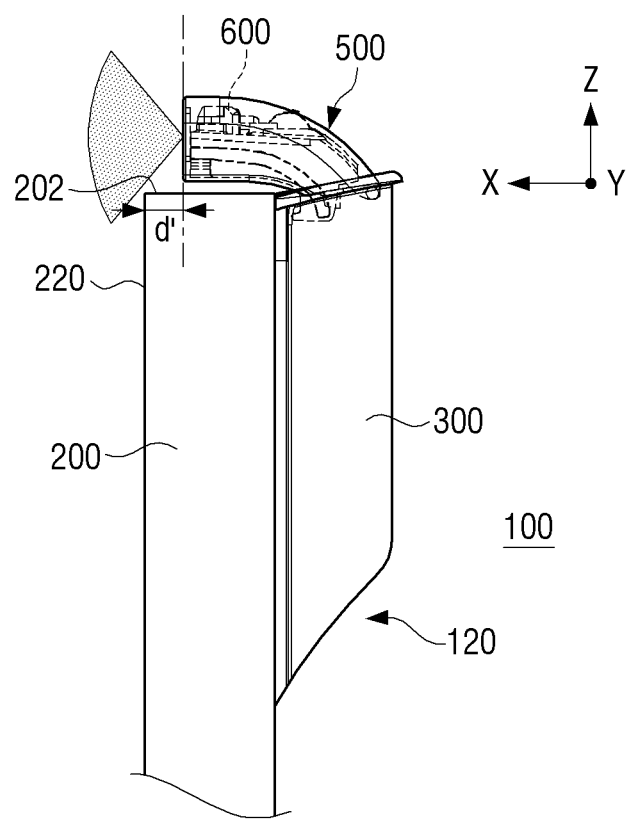
FIG. 4 is a cross-sectional view illustrating a photographing unit provided on the display apparatus of FIG. 2 when the photographing unit is arranged at a second position.
Figure 5:
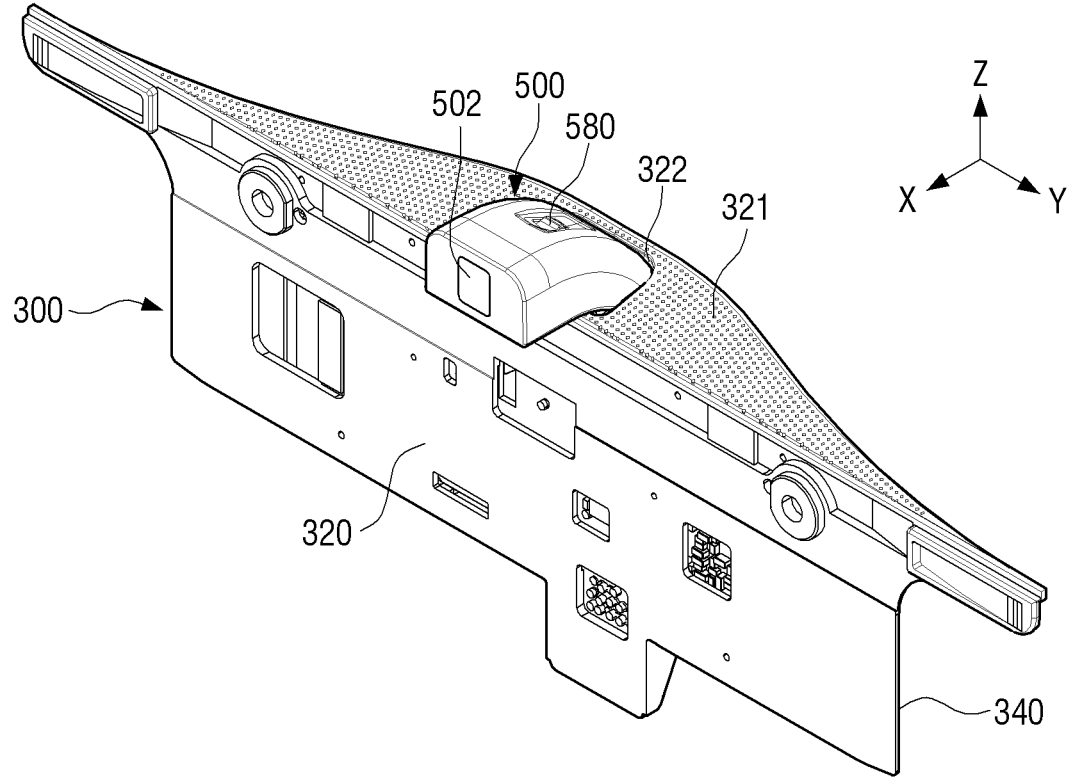
FIG. 5 is a perspective view illustrating an auxiliary casing of the display apparatus of FIG. 1.
Figure 6:
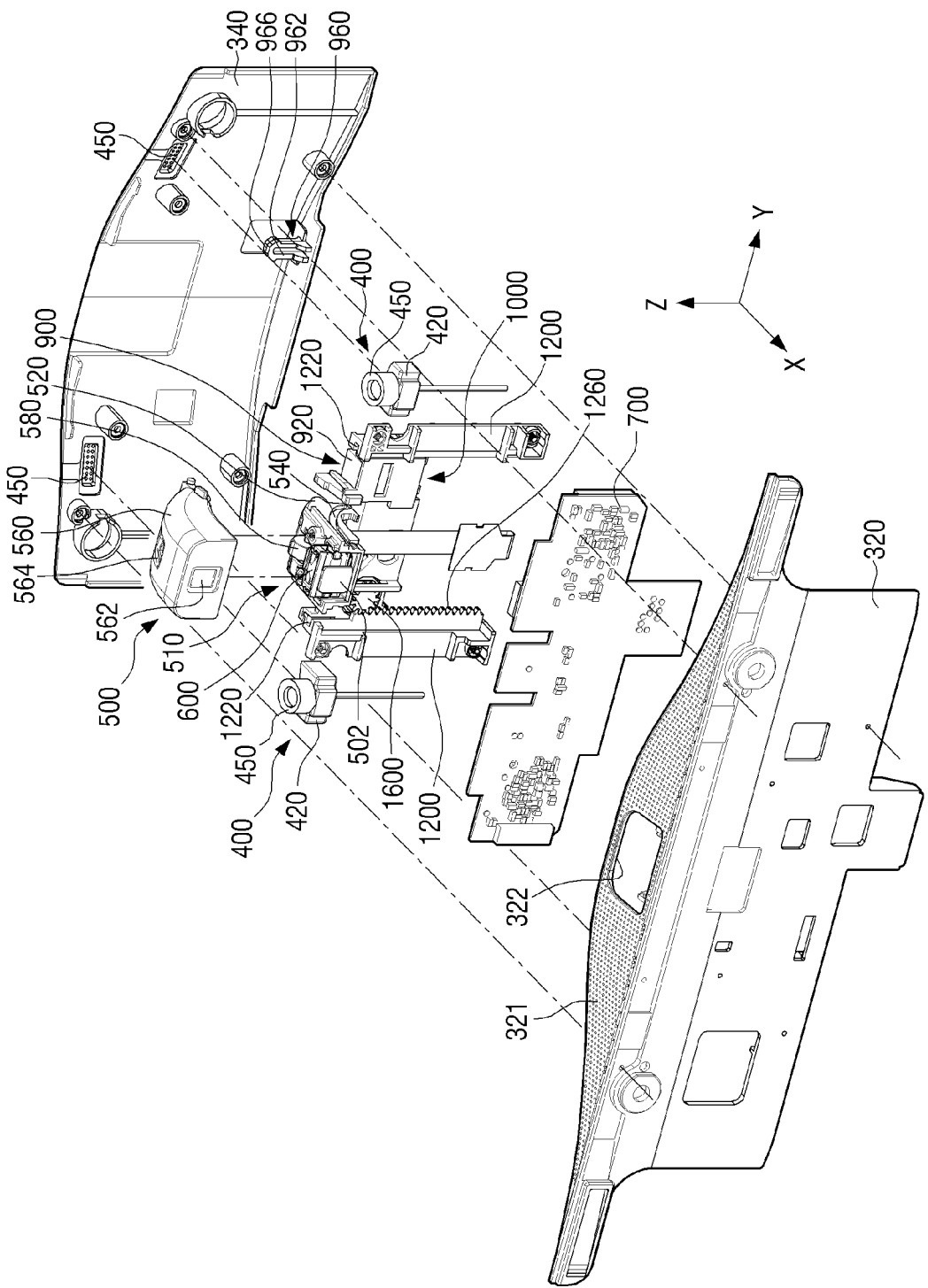
FIG. 6 is an exploded perspective view illustrating the auxiliary casing of FIG. 5.

FIGS. 1 and 2 are perspective views illustrating a display apparatus according to an embodiment of the present disclosure. FIG. 3 is a cross-sectional view illustrating a photographing unit provided on the display apparatus of FIG. 1 when the photographing unit is arranged at a first position, and FIG. 4 is a cross-sectional view illustrating a photographing unit provided on the display apparatus of FIG. 2 when the photographing unit is arranged at a second position. FIG. 5 is a perspective view illustrating an auxiliary casing of the display apparatus of FIG. 1, and FIG. 6 is an exploded perspective view illustrating the auxiliary casing of FIG. 5.

Referring to FIGS. 1 and 2, a display apparatus 100 may sense various user gestures and voices through user interactions and may perform various corresponding control operations. The control operations may be, for example, channel change, volume up/down, and execution of an application.

The display apparatus 100 may be an LCD television set, an LED television set, or an OLED television set embodied as a flat panel display. In addition, the display apparatus 100 may be a flat panel display of another type, a curved display rather than the flat panel display, or a flexible display. Further, the display apparatus may be a computer monitor rather than the television set.

The display apparatus 100 as described above includes a display main body 120 and a photographing unit 500.

The display apparatus 100 may sense various user gestures and voices through the user interactions and may perform various corresponding control operations. The control operations may be, for example, channel change, volume up/down, and execution of an application.

The display apparatus 100 may be an LCD television set, an LED television set, or an OLED television set as a flat panel display. In addition, the display apparatus 100 may be a flat panel display of another type, a curved display rather than the flat panel display, or a flexible display. Further, the display apparatus may be a computer monitor rather than the television set.

The display main body 120 includes a main casing 200, a display panel (not illustrated), a control board (not illustrated), a power board (not illustrated), and an auxiliary casing 300.

The main casing 200 accommodates various kinds of components of the display apparatus 100, such as the display panel (not illustrated), the control board (not illustrated), and the power board (not illustrated).

The display panel is a component that displays an image, and has an image display surface 220. A user may view various pieces of content provided from the display apparatus 100 through the image display surface 220.

The control board is to control the operation of the display apparatus 100, and may control the operation of the display apparatus 100 in accordance with a command according to the user interaction. The power board is to supply a voltage to the display apparatus 100.

The auxiliary casing 300 is mounted on an upper portion of the rear surface of the main casing 200 as described above, and accommodates the photographing unit 500. In this embodiment, the auxiliary casing 300 is separately mounted on the rear surface of the main casing 200, and it is also possible to form the auxiliary casing 300 in a body with the main casing 200. Although it is possible to mount the casing 300 on a bottom portion of the rear surface of the main casing 200 or on a side of the main casing 200.

Referring to FIGS. 5 and 6, the auxiliary casing 300 includes a front casing 320 and a rear casing 340.

The front casing 320 is engaged with the upper portion of the rear surface of the main casing 200. The front casing 320 has an opening 322 on an upper surface thereof 321, through which the photographing unit 500 passes or extends. Through the opening 322, the photographing unit 500 projects out of the auxiliary casing 300 or is accommodated in the auxiliary casing 300.

The rear casing 340 is engaged with the front casing 320 to form the rear surface of the auxiliary casing 300 or be flush with a top surface of casing 300. In a space between the front casing 320 and the rear casing 340, various kinds of components for user interactions of the display apparatus 100, such as the photographing unit 500 and the voice sensing unit 400, are accommodated.

The photographing unit 500 is to sense user's gestures, and is slidably mounted on the auxiliary casing 300. During non-photographing, the photographing unit 500 is accommodated in the auxiliary casing 300 and is arranged so as not to exceed the height of the auxiliary casing 300. When the photographing unit 500 is accommodated in the auxiliary casing 300, a protection window 502 is arranged at the same height as the height of the upper surface 202 of the main casing 200.

Referring to FIGS. 3 to 6, the photographing unit 500 includes a camera casing 510, a camera module 600, and a tilt lever 580.

The camera casing 510 includes a base casing 520 and a cover casing 560.

In the base casing 520, the camera module 600 and the tilt lever 580 are mounted, and the protection window 502 is mounted on the front surface thereof. The base casing 520 may be made of an aluminum material to dissipate heat generated from the camera module 600.

The cover casing 560 is engaged with the base casing 520 to form an external appearance of the photographing unit 500. As illustrated in FIG. 6, on the cover casing 560, a front opening 562 into which the protection window 502 is inserted and a tilt lever opening 564 for exposing the tilt lever 560 are formed. On the other hand, unlike the base casing 520, the cover casing 560 may be made of a plastic material.

The camera module 600 is a constituent element provided in the photographing unit 500 to sense the user's gestures.

The photographing unit 500 has the built-in camera module 600 to sense the user's gestures. The camera module 600 includes at least one lens (not illustrated) collecting light of the image, an image sensor (not illustrated) converting the image into an electrical signal, and an actuator (not illustrated) configured to adjust a focus through movement of the lens.

As illustrated in FIGS. 1 and 3, the photographing unit 500 is arranged at the first position that is accommodated in the auxiliary casing 300 during the non-photographing or no-image capturing. The photographing unit 500 is arranged to be spaced apart from the image display surface as far as the thickness d of the main casing 200 from the image display surface 220. That is, the distance d between the photographing unit 500 and the image display surface 220 may be substantially the same as the thickness d of the main casing 200. In this case, the camera module 600 is arranged to look toward an upper direction (+Z direction). Through this, during the non-photographing, the photographing unit 500 is hidden as seen from the front of the display apparatus 100. Accordingly, user inconvenience that a user may feel due to the projecting photographing unit 500 can be solved. Further, during the non-photographing, the external appearance of the display apparatus 100 is neat and tidy, and thus an advanced image of the product can be sought.

As illustrated in FIGS. 2 and 4, during user's photographing, the photographing unit 500 is arranged at the second position or image-capture position where the photographing unit 500 projects out of the auxiliary casing 300. The photographing unit 500 projects in the front direction (+X direction) of the display apparatus 100 toward a view position at which a user would view the display and is arranged on the upper surface 202 of the main casing 200. In this case, the photographing unit 500 is arranged to be spaced apart for a predetermined distance d' from the image display surface 220, and the protection window 502 of the photographing unit 500 is arranged somewhat behind the image display surface 220. That is, the distance d' between the photographing unit 500 and the image display surface 220 is shorter than the thickness d of the main casing 200 so that the main casing 200 does not block the camera view as depicted in FIG. 4. As compared with the first position (the position where the photographing unit 500 is accommodated in the auxiliary casing 300) as described above, the photographing unit 500 is arranged closer to the image display surface 220 when the photographing unit 500 is at the second position rather than at the first position. Accordingly, during photographing, it is not necessary for the photographing unit 500 to additionally project in the upper direction (+Z direction) of the display apparatus 100 in order to secure a large camera and unblocked viewing angle. In other words, the display apparatus 100 can secure a large camera viewing angle without spoiling the beauty of the display apparatus 100.

The tilt lever 580 is a constituent element for adjusting a tilt of a camera. The term "tilt" means photographing in a state where the position of the camera is fixed and only an angle is changed from top to bottom or from bottom to top. In accordance with an operation of the tilt lever 580, the camera module 600 is rotated up and down around the Y-axis direction. The tilt lever 580 is exposed to an outside through the tilt lever opening 564 of the cover casing 560. A user may adjust the tilt of the camera as much as desired through the operation of the tilt lever 580.

Figure 7:
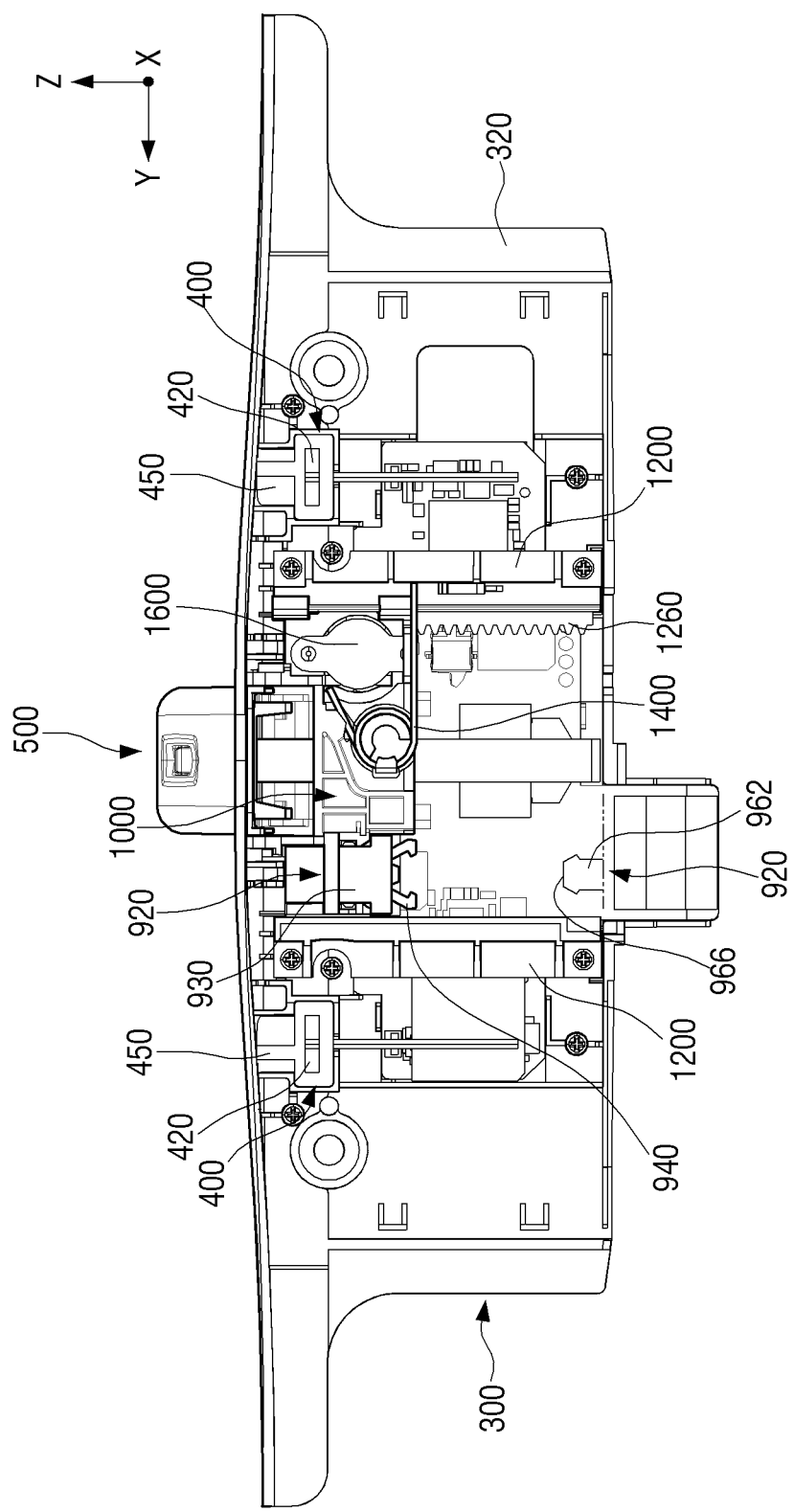
FIG. 7 is a view illustrating an interior of the auxiliary casing of FIG. 5.

FIG. 7 is a view illustrating an interior of the auxiliary casing of FIG. 5.

Referring to FIGS. 6 and 7, the display apparatus 100 further includes a voice sensing unit 400 and a PCB board 700.

The voice sensing unit 400 is mounted to be accommodated in the auxiliary casing 300, and is not exposed out of the auxiliary casing 300. In the display apparatus 100 according to this embodiment, since the voice sensing unit 400 is not integrally provided with the photographing unit 500, but is provided separately from the photographing unit 500, it is not necessary to provide an additional space for the voice sensing unit 400 in the photographing unit 500. Accordingly, the volume of the photographing unit 500 that is exposed to the outside can be reduced in the display apparatus 100 according to this embodiment.

The voice sensing unit 400 includes a microphone 420 and a microphone hole 450.

The microphone 420 is a constituent element for sensing user's voice. One or more microphones 420 may be provided, and in this embodiment, two microphones 420 are provided. The two microphones 420 are provided on both sides of the photographing unit 500, and are arranged adjacent to the upper surface 321 of the front casing 320.

The microphone hole 450 guides transfer of the user's voice to the microphone 420. In this embodiment, four microphone holes 450 are provided. Specifically, two microphone holes 450 are provided on the rear casing 340 to face the rear surface of the microphone 420.

The PCB board 700 determines the user interaction based on user's gesture information sensed by the photographing unit 500 and user's voice information sensed by the voice sensing unit 400. The PCB board 700 transmits information on the user interaction to the control board (not illustrated) of the display apparatus 100, and the control board (not illustrated) of the display apparatus 100 controls the display apparatus 100 based on the information on the user interaction.

On the other hand, the PCB board 700 may not determine the user interaction based on the user's gesture information sensed by the photographing unit 500 and the user's voice information sensed by the voice sensing unit 400, but may transmit the user's gesture information sensed by the photographing unit 500 and the user's voice information sensed by the voice sensing unit 400 directly to the control board of the display apparatus. In this case, the control board of the display apparatus 100 may determine the user interaction based on the user's gesture information sensed by the photographing unit 500 and the user's voice information sensed by the voice sensing unit 400, and then may control the display apparatus accordingly.

Referring to FIGS. 6 and 7, the display apparatus 100 further includes a locking unit 900, a slider 1000, a guide rail 1200, an elastic member 1400, and a damping member 1600 so that the photographing unit 500 becomes movable between the first position (the position where the photographing unit 500 is accommodated in the auxiliary casing 300) and the second position (the position where the photographing unit 500 projects out of the auxiliary casing 300).

The locking unit 900 is a constituent element for locking the photographing unit 500 that is arranged at the first position in the auxiliary casing 300. The locking unit 900 releases the locking if the photographing unit 500 is arranged at the second position.

The locking unit 900 includes a latch unit 920 and a locking member 960.

The latch unit 920 is mounted on the slider 1000, and the slider 1000 is engaged with the photographing unit 500. Accordingly, the latch unit 920 is connected to the photographing unit 500 through the slider 1000. The latch unit 920 is engaged with the locking member 960 and is separated from the locking member 960 to lock and unlock the photographing unit 500.

The latch unit 920 includes a latch housing 930 and a hook member 940.

The latch housing 930 is mounted on the slider 1000. A spring (not illustrated) that pushes the hook member 940 out of the latch housing 930 when the locking is released is built in the latch housing 930. A pair of hook members 940 are provided and mounted on the latch housing 930 to be movable between an exposure position for being exposed out of the latch housing 930 and a partial insertion position for being partially inserted into the latch housing 930.

The locking member 960 is provided on the rear casing 340 of the auxiliary casing 300. The locking member 960 is formed to project from the lower surface of the inner side of the rear casing 340 in the upper direction (+Z direction). The locking member 960 is integrally formed with the rear casing 340, but is not limited thereto. It is also possible that the locking member 960 is provided as a separate member and is mounted on the rear casing.

The locking member 960 includes a body portion 962 and an engagement portion 966.

The body portion 962 is formed to extend from the rear casing 340 in the vertical direction (+Z direction). The engagement portion 966 is provided at the front end of the body portion 962, and is detachably engaged with the hook member 940 of the latch unit 920.

If the photographing unit 500 is arranged at the first position (the position where the photographing unit 500 is accommodated in the auxiliary casing 300), the locking member 960 is engaged with the hook member 940 of the latch unit 920, and if the photographing unit 500 is arranged at the second position, (the position where the photographing unit 500 projects out of the auxiliary casing 300), the locking member 960 is released from the hook member 940 of the latch unit 920.

The slider 1000 is engaged with the photographing unit 500, and is slidably mounted in the auxiliary casing 300 in the upper/lower direction (Z direction). The guide rail 1200 is to guide sliding of the slider 1000 in the upper/lower direction (Z direction), and is provided on each of both sides of the slider 100. A guide slit 1220 into which a side end portion of the slider 1000 is inserted is formed on each of the guide rails 1200.

The elastic member 1400 is a constituent element that provides a driving force for moving the slider 1000 in the upper direction (+Z direction) when the locking of the photographing unit 500 is released. One end of the elastic member 1400 is fixed to the slider 1000, and the other end of the elastic member 1400 is fixed to the guide rail 1200. The elastic member 1400 may include a spring, and in this embodiment, the elastic member 1400 includes a torsion bar spring.

The damping member 1600 is to adjust a sliding speed of the slider 1000. The damping member 1600 includes a rotary damper, and is mounted to be engaged with a damper rail 1260 that is provided on the guide rail 1200. During the sliding of the slider 1000, the damping member 1600 is rotated along the damper rail 1260 of the guide rail 1200 to adjust the sliding speed of the slider 1000. Accordingly, the damper rail 1260 of the guide rail 1200 is also provided only on the guide rail 1200 that is adjacent to the damping member 1600.

Hereinafter, referring to FIGS. 8 to 10, the configuration that guides the movement of the photographing unit 500 will be described in more detail.

Figure 8:
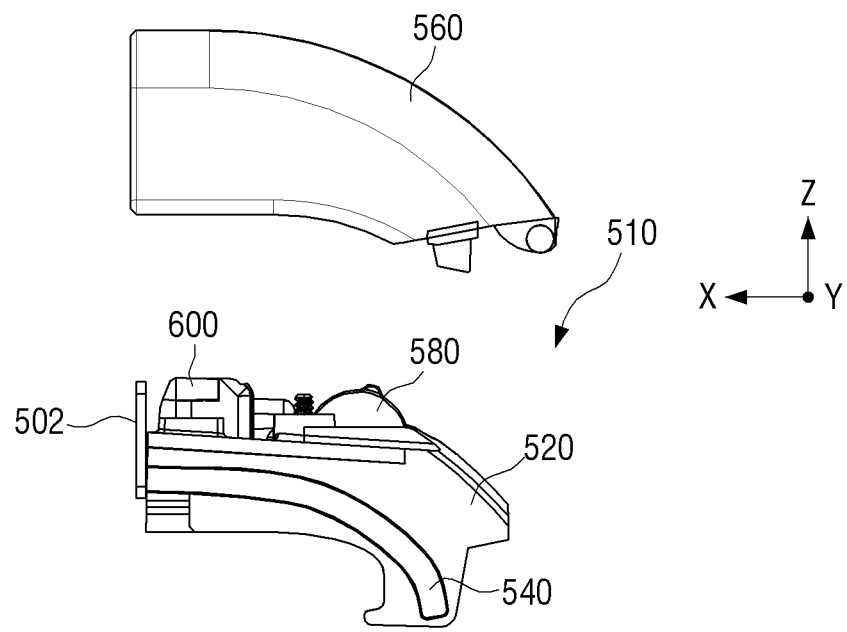
FIG. 8 is an exploded cross-sectional view illustrating a photographing unit provided in the auxiliary casing of FIG. 5.
Figure 9:
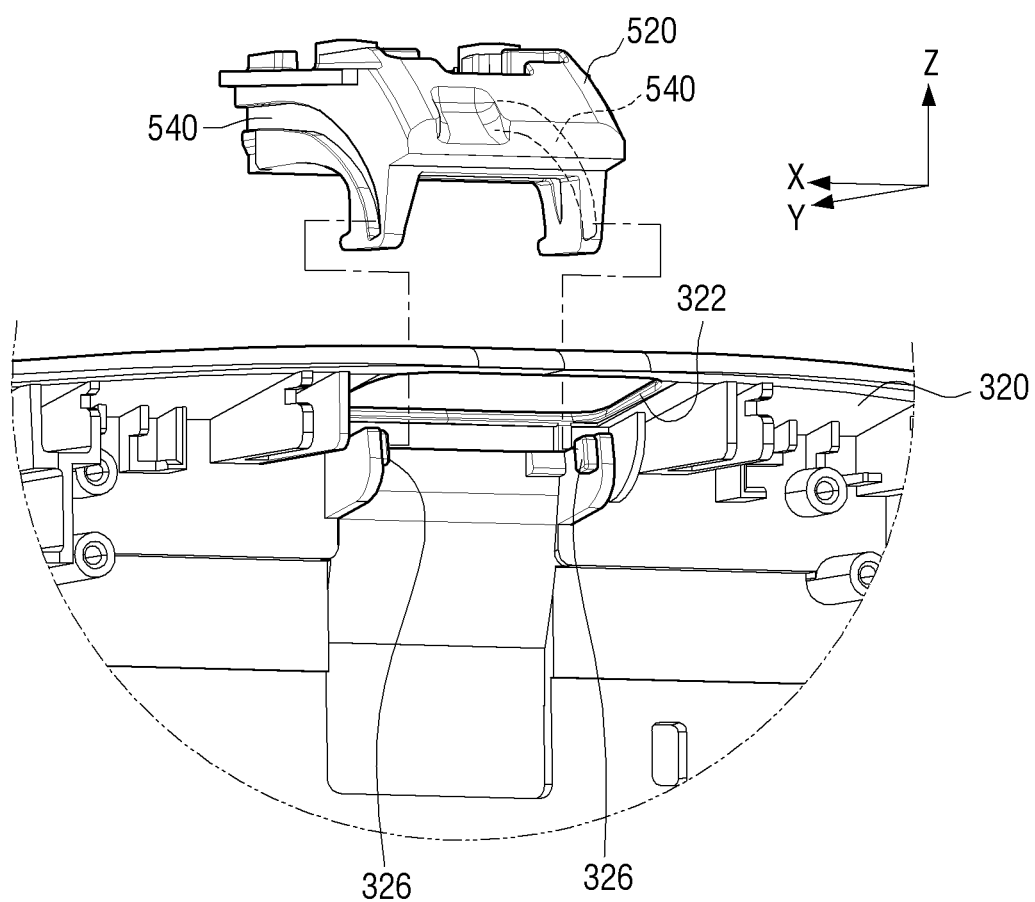
FIG. 9 is an exploded perspective view illustrating an engagement relationship between the auxiliary casing of FIG. 5 and a base casing of a photographing unit.
Figure 10:
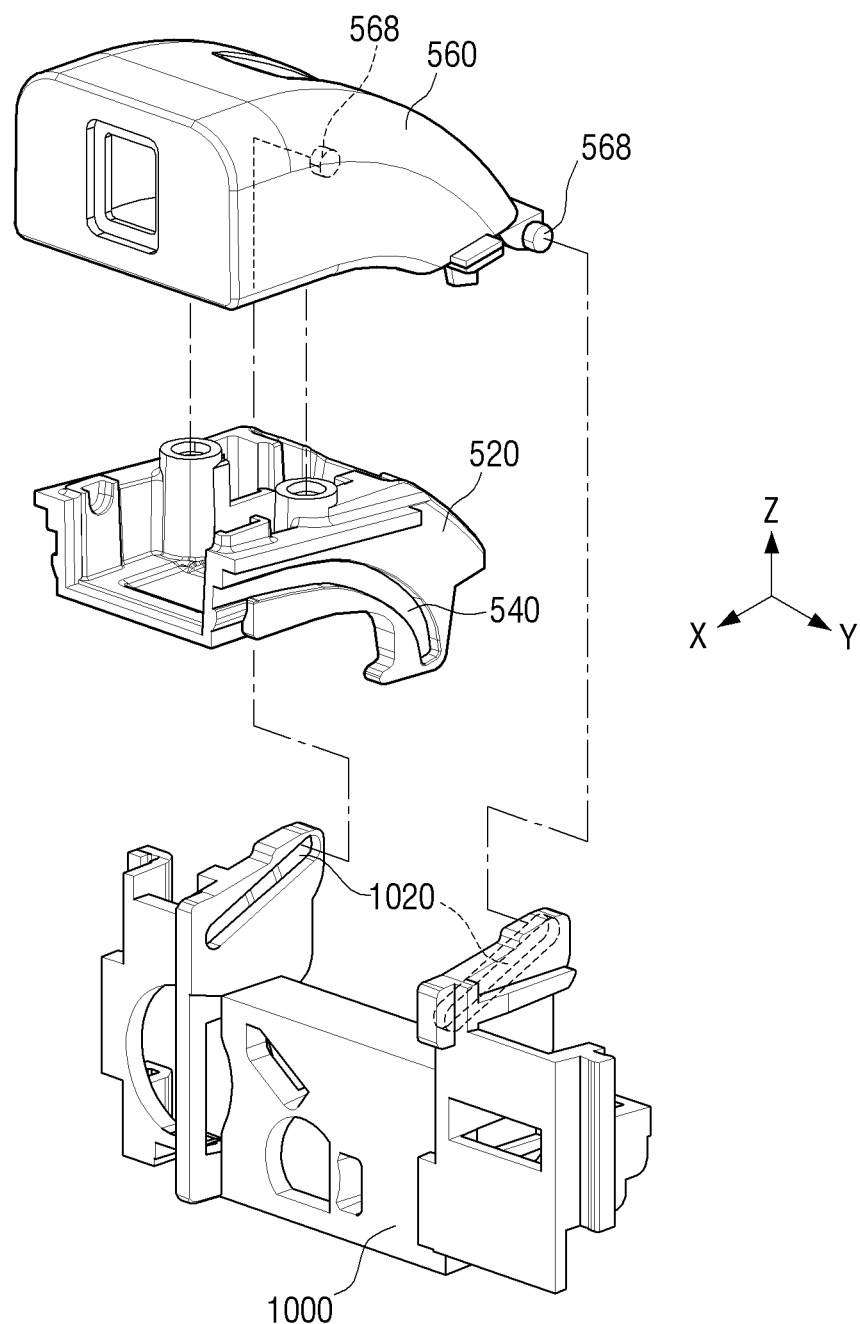
FIG. 10 is an exploded perspective view illustrating an engagement relationship between a photographing unit provided in the auxiliary casing of FIG. 5 and a slider.

FIG. 8 is an exploded cross-sectional view illustrating a photographing unit provided in the auxiliary casing of FIG. 5, FIG. 9 is an exploded perspective view illustrating an engagement relationship between the auxiliary casing of FIG. 5 and a base casing of a photographing unit, and FIG. 10 is an exploded perspective view illustrating an engagement relationship between a photographing unit provided in the auxiliary casing of FIG. 5 and a slider.

Referring to FIG. 8, slide guide grooves 540 are formed on both side surfaces of the base casing 520 of the photographing unit 500. The respective slide guide grooves 540 are in the form of a curve that is gradually curved in the lower direction (−Z direction).

Referring to FIG. 9, a pair of guide projections 326, which are respectively inserted into the pair of slide guide grooves 540 of the base casing 520, are formed on a portion below the opening 322 of the front casing 320. The pair of guide projections 326 are arranged to face each other. The pair of guide projections 326 are respectively inserted into the pair of slide guide grooves 540 to guide the sliding of the base casing 520 during the movement of the photographing unit 500.

Referring to FIG. 10, moving projections 568 are formed on end portions of both sides of the cover casing 560. On the slider 1000, a pair of cover guide grooves 1020, into which the pair of moving projections 568 are inserted, are formed. The pair of cover guide grooves 1020 guide the sliding of the cover casing 560 during the movement of the photographing unit 500.

Hereinafter, the operation of the photographing unit 500, which slides between the first position (the position where the photographing unit 500 is accommodated in the auxiliary casing 300) and the second position (the position where the photographing unit 500 projects out of the auxiliary casing 300), will be described in detail.

First, the operation of the photographing unit 500 which slides from the second position to the first position will be described.

Figure 11:
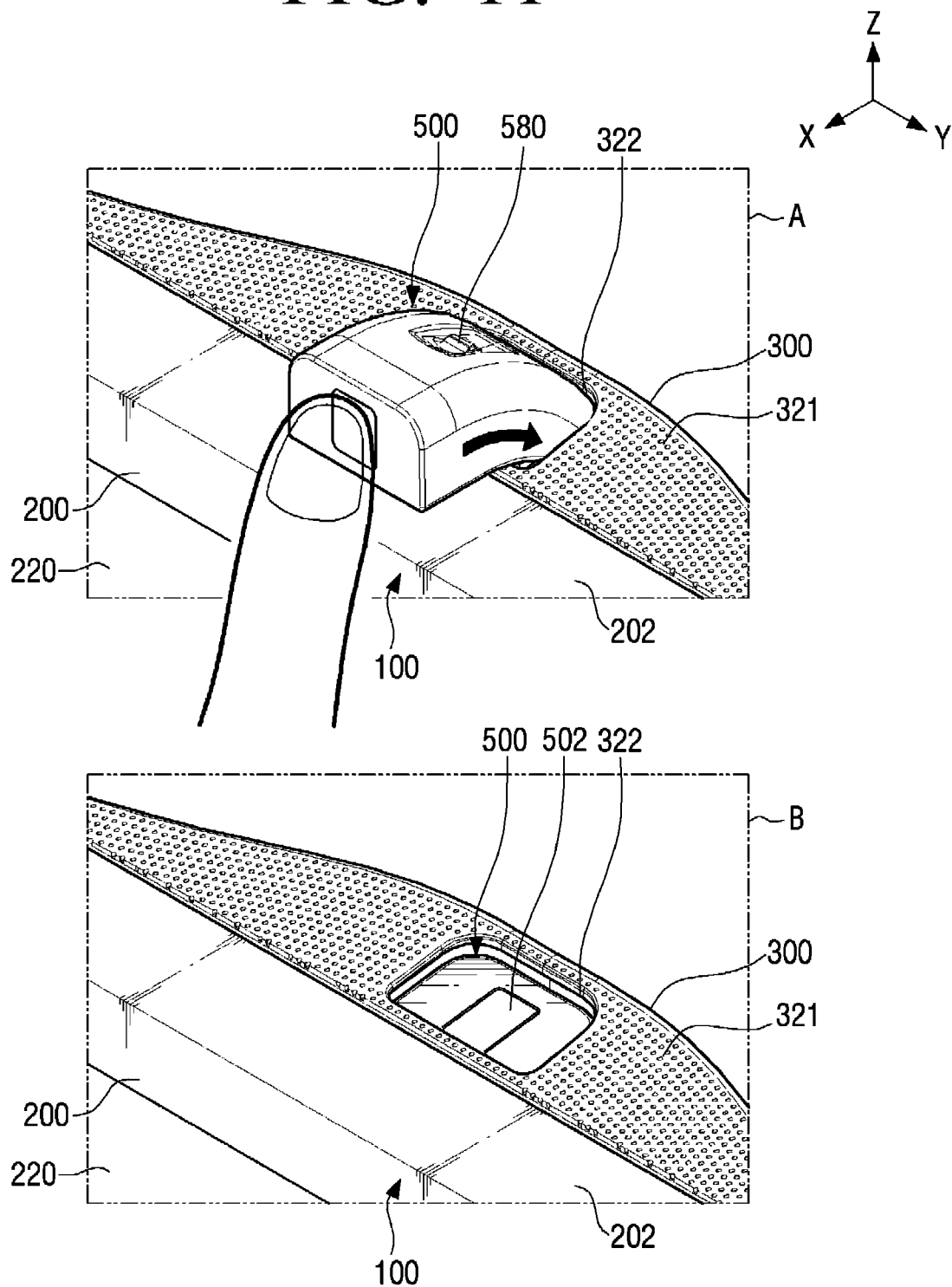
FIG. 11 is a view explaining a sliding operation of a photographing unit when the photographing unit slides from a second position to a first position.
Figure 12:
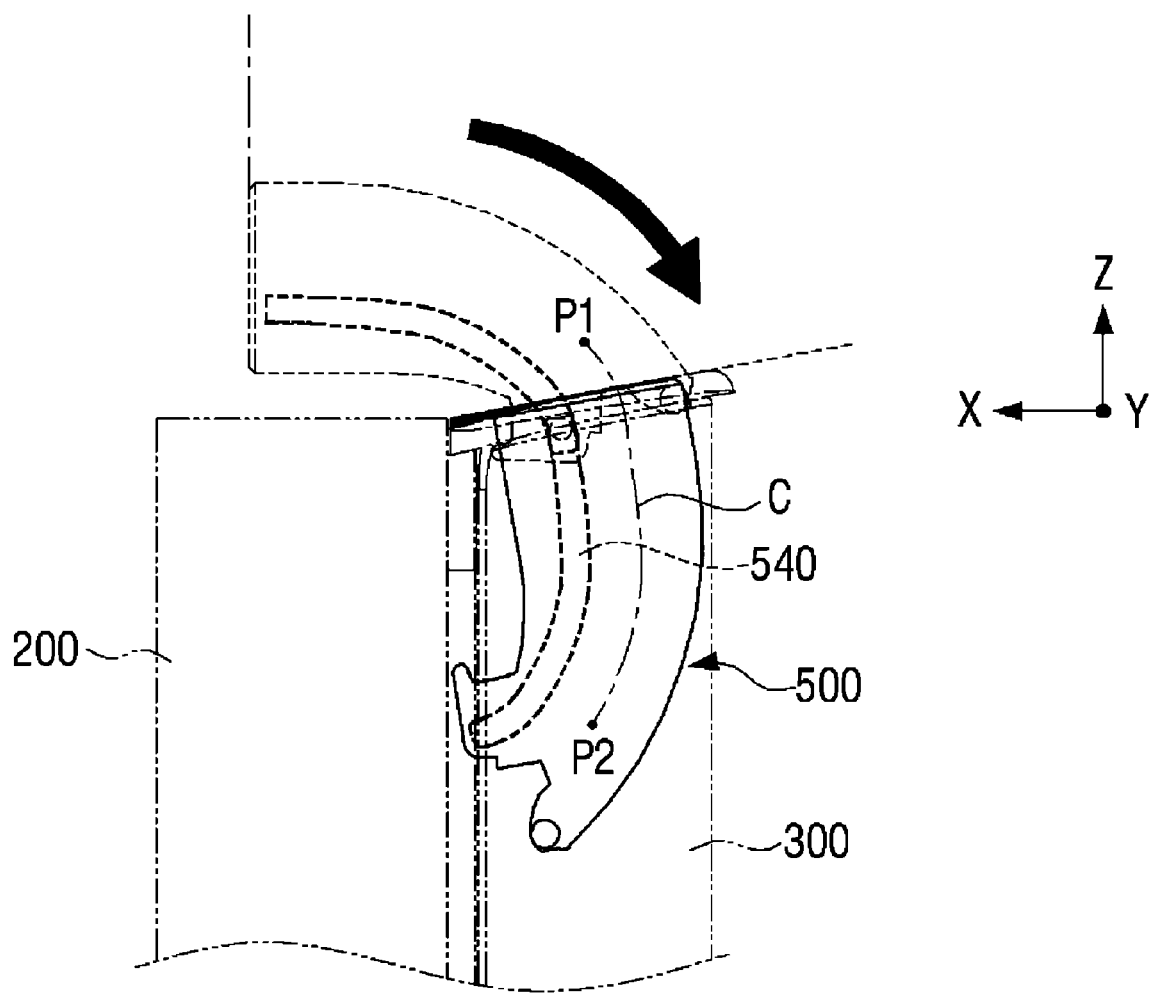
FIG. 12 is a view explaining a moving trace of a photographing unit when the photographing unit slides from a second position to a first position.
Figure 13:
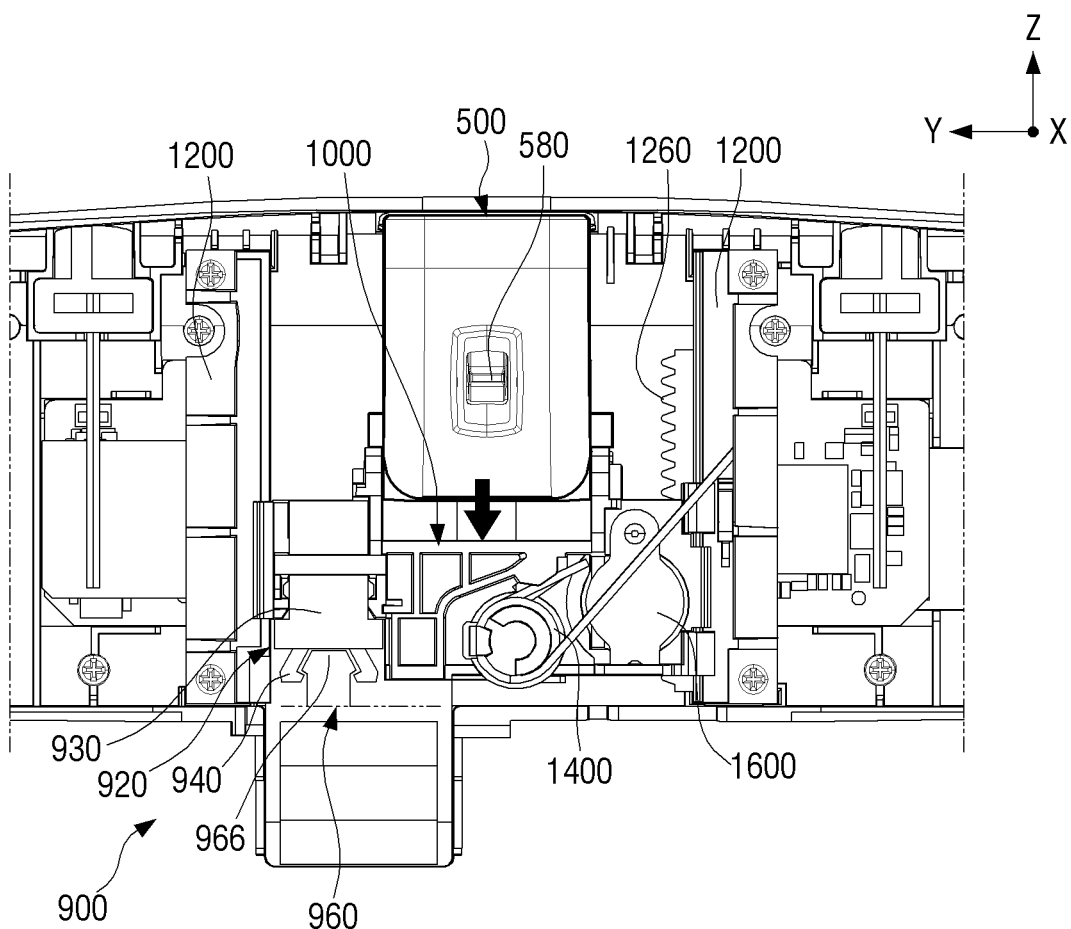
FIG. 13 is a view explaining locking of a photographing unit.

FIG. 11 is a view explaining a sliding operation of a photographing unit when the photographing unit slides from a second position to a first position, FIG. 12 is a view explaining a moving trace of a photographing unit when the photographing unit slides from a second position to a first position, and FIG. 13 is a view explaining locking of a photographing unit.

Referring to FIG. 11, during non-photographing, the user may accommodate the photographing unit 550 in the auxiliary casing 300. Through this, the display apparatus 100 can keep the photographing unit 500 so that the photographing unit 500 is not seen from the front of the display apparatus 100 during the non-photographing.

As illustrated in portion A of FIG. 11, the user presses the front surface of the photographing unit 500 with a finger during the non-photographing. In accordance with the user's pressing the front surface, the photographing unit 500 slides along the lower direction.

Referring to FIG. 12, if the user presses the front surface of the photographing unit 500, the photographing unit 500 moves from the second position to the first position through sliding to follow a curve or a curved trace C, and then is accommodated in the auxiliary casing 300. Here, the curved trace C corresponds to the shape of the slide guide groove 540 of the photographing unit 500. That is, the photographing unit 500 moves from the second position to the first position while drawing the curved trace C that corresponds to the shape of the slide guide groove 540.

At this time, a certain point of the photographing unit 500 moves along the curved trace C that corresponds to the shape of the slide guide groove 540 from the position P1 in a state where the photographing unit 500 is arranged at the second position to the position P2 in a state where the photographing unit 500 is arranged at the first position. Other points of the photographing unit 500 may move in the same manner.

Thereafter, the user further presses the photographing unit 500 until the photographing unit 500 presses a somewhat lower portion of the opening 321 of the auxiliary casing 300. This is to lock the photographing unit 500, and the detailed explanation thereof will be made with reference to FIG. 13.

Referring to FIG. 13, during the movement of the photographing unit 500, the slider 1000 that is engaged with the photographing unit 500 slides in the lower direction (−Z direction) in the auxiliary casing 300. At this time, the damping member 1600 is engaged with the damper rail 1260 of the guide rail 1200 to be rotated, and prevents the slider 1000 from abruptly move in the lower direction (−Z direction).

During the movement of the slider 100, the latch unit 920 moves in the lower direction (−Z direction) of the auxiliary casing 300. At this time, since the latch unit 920 and the locking member 960 are engaged with each other, the photographing unit 500 is locked in the first position.

As for the engagement of the latch unit 920 and the locking member 960, the latch unit 920 moves in the lower direction (−Z direction) of the auxiliary casing 300 as described above, and thus the pair of hook members 940 come in contact with the engagement portion 966 of the locking member 960. Thereafter, the pair of hook members 940 moves from the exposure position where the hook members are exposed out of the latch housing 930 to the insertion position where the hook members are partially inserted into the latch housing 930. At this time, if the user releases the pressing of the photographing unit 500, the slider 1000 slightly moves in the upper direction (+Z direction) of the auxiliary casing 300 due to the spring provided inside the latch unit 920. At this time, the pair of hook members 940 of the latch unit 920 get elastically closer to each other to be hook-engaged with the engagement portion 966 of the locking member 960.

When the user releases the pressing of the front surface, the photographing unit 500 ascends to be somewhat higher than the height of the upper surface 321 of the auxiliary casing 300 as illustrated in FIG. 1 due to the movement of the auxiliary casing 300 of the slider 1000 in the upper direction (+Z direction).

On the other hand, when the slider 1000 moves in the lower direction (−Z direction), the elastic member 1400 is extended in the lower direction (−Z direction), and an elastic pressing force is generated to force the slider 1000 to return to the upper direction (+Z direction). This elastic pressing force may force the slider 1000 to move in the upper direction (+Z direction) when the locking of the photographing unit 500 is released.

Next, the operation of the photographing unit 500 which slides from the first position to the second position will be described.

Figure 14:
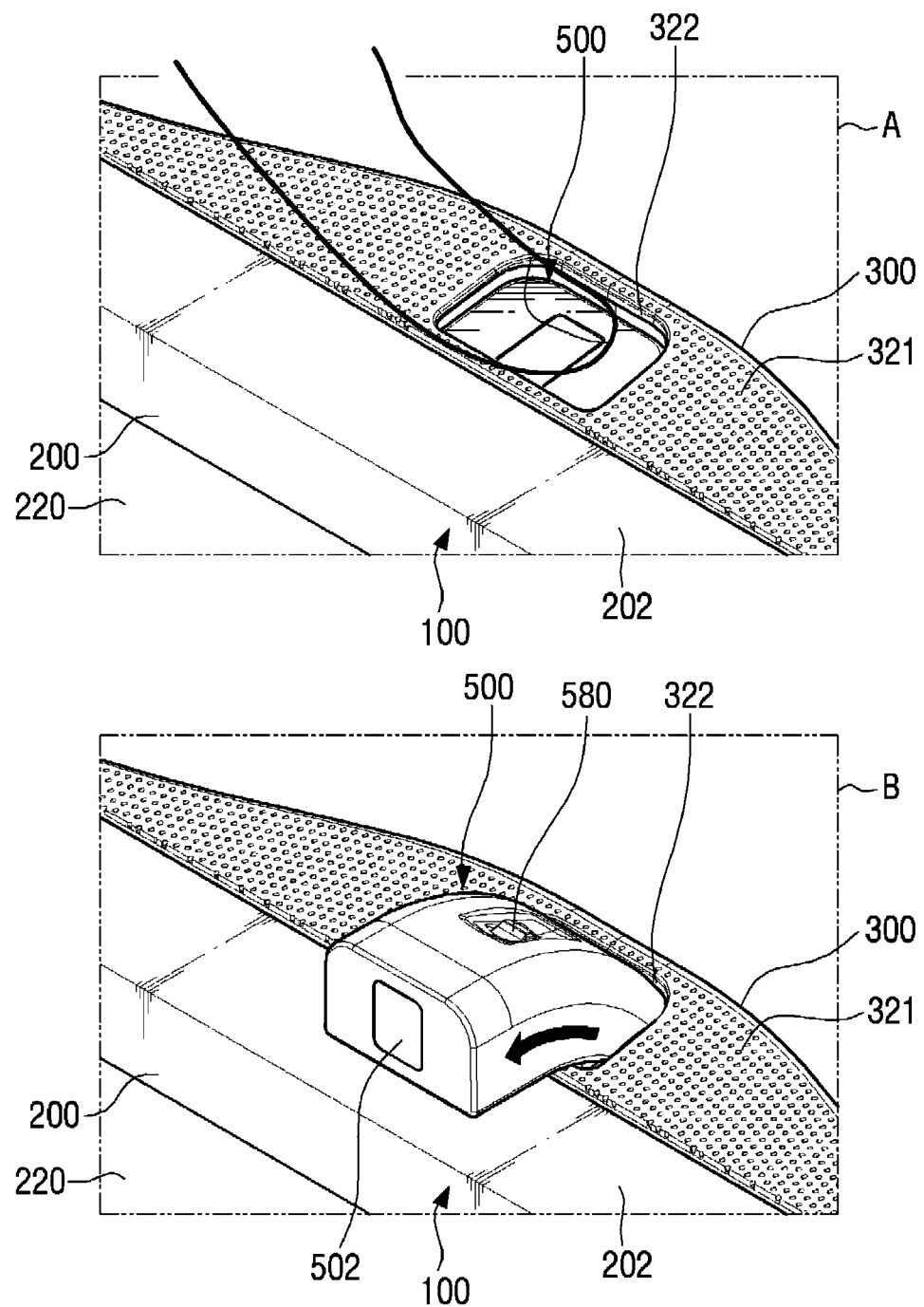
FIG. 14 is a view explaining a sliding operation of a photographing unit when the photographing unit slides from a first position to a second position.
Figure 15:
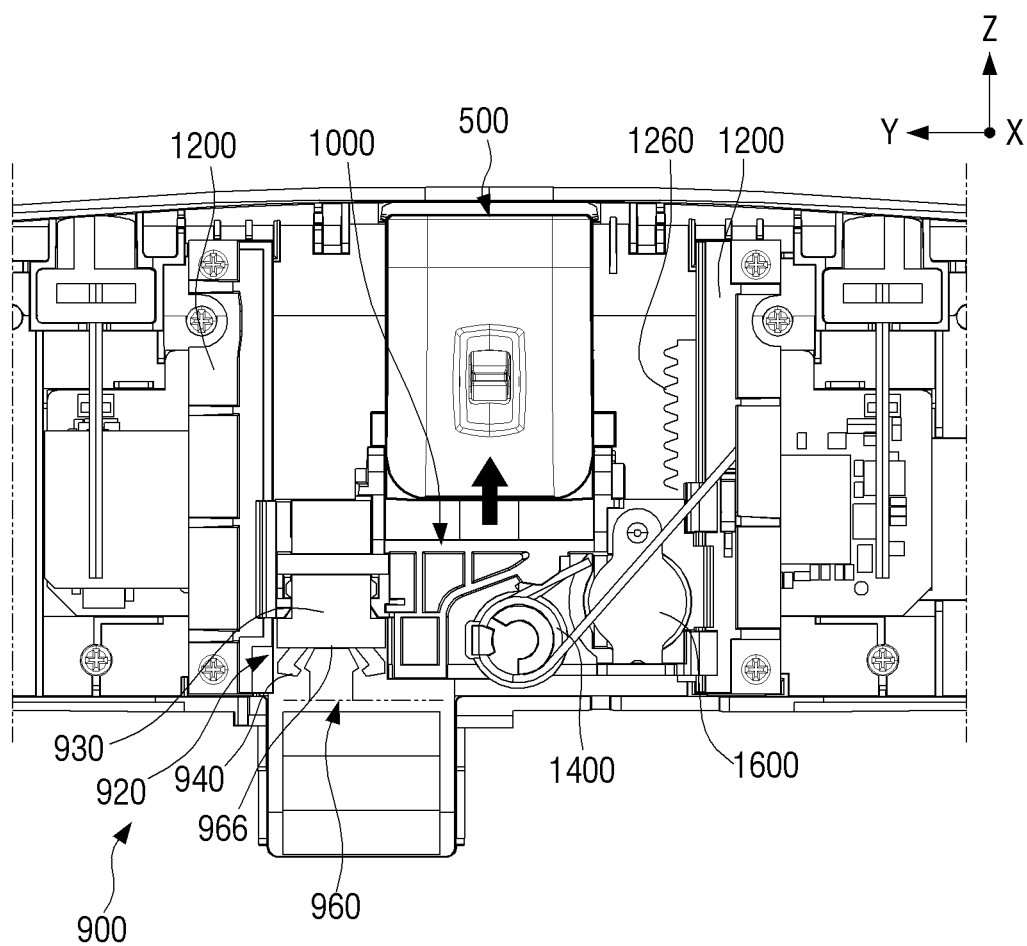
FIG. 15 is a view explaining locking release of a photographing unit.

FIG. 14 is a view explaining a sliding operation of a photographing unit when the photographing unit slides from a first position to a second position, FIG. 15 is a view explaining locking release of a photographing unit, and FIG.

16 is a view explaining a moving trace of a photographing unit when the photographing unit slides from a first position to a second position.

Referring to FIG. 14, during the photographing, the user may project the photographing unit 500 out of the display apparatus 100. Through this, the display apparatus 100 can sense gestures of the user who is positioned in front of the display apparatus 100 through the photographing unit 500.

As illustrated in portion A of FIG. 14, during photographing, the user presses the front surface of the photographing unit 500 with a finger until the photographing unit 500 presses a somewhat lower portion of the opening 321 of the auxiliary casing 300. This is to release the locking of the photographing unit 500, and the detailed explanation thereof will be made with reference to FIG. 15.

Referring to FIG. 15, if the photographing unit 500 presses a somewhat lower portion of the opening 321 of the auxiliary casing 300, the slider 1000 slightly moves in the lower direction (−Z direction) of the auxiliary casing 300. At this time, the pair of hook members 940 of the latch unit 920 are pushed to the exposure position where the hook members are exposed out of the latch housing 930 due to the internal spring. If the pair of hook members 940 are exposed out of the latch housing 930, they are elastically spaced apart from each other and are separated from the engagement portion 966 of the locking member 960. Through this, the locking of the photographing unit 500 is released in the auxiliary casing 300.

If the locking of the photographing unit 500 is released, the elastic member 1400 provides an elastic pressing force in the upper direction (+Z direction) of the auxiliary casing 300 so that the slider 1000 can move in the upper direction (+Z direction) of the auxiliary casing 300. Due to the elastic pressing force provided by the elastic member 1400, the slider 1000 slides in the upper direction (+Z direction) of the auxiliary casing 300. At this time, the damping member 1600 is engaged with the damper rail 1260 of the guide rail 1200 to be rotated, and prevents the slider 1000 from abruptly move in the upper direction (+Z direction). During the movement of the slider 1000 in the upper direction (+Z direction), the photographing unit 500 slides together to project out of the auxiliary casing 300. The sliding of the photographing unit 500 will be described in detail with reference to FIG. 16.

Figure 16:
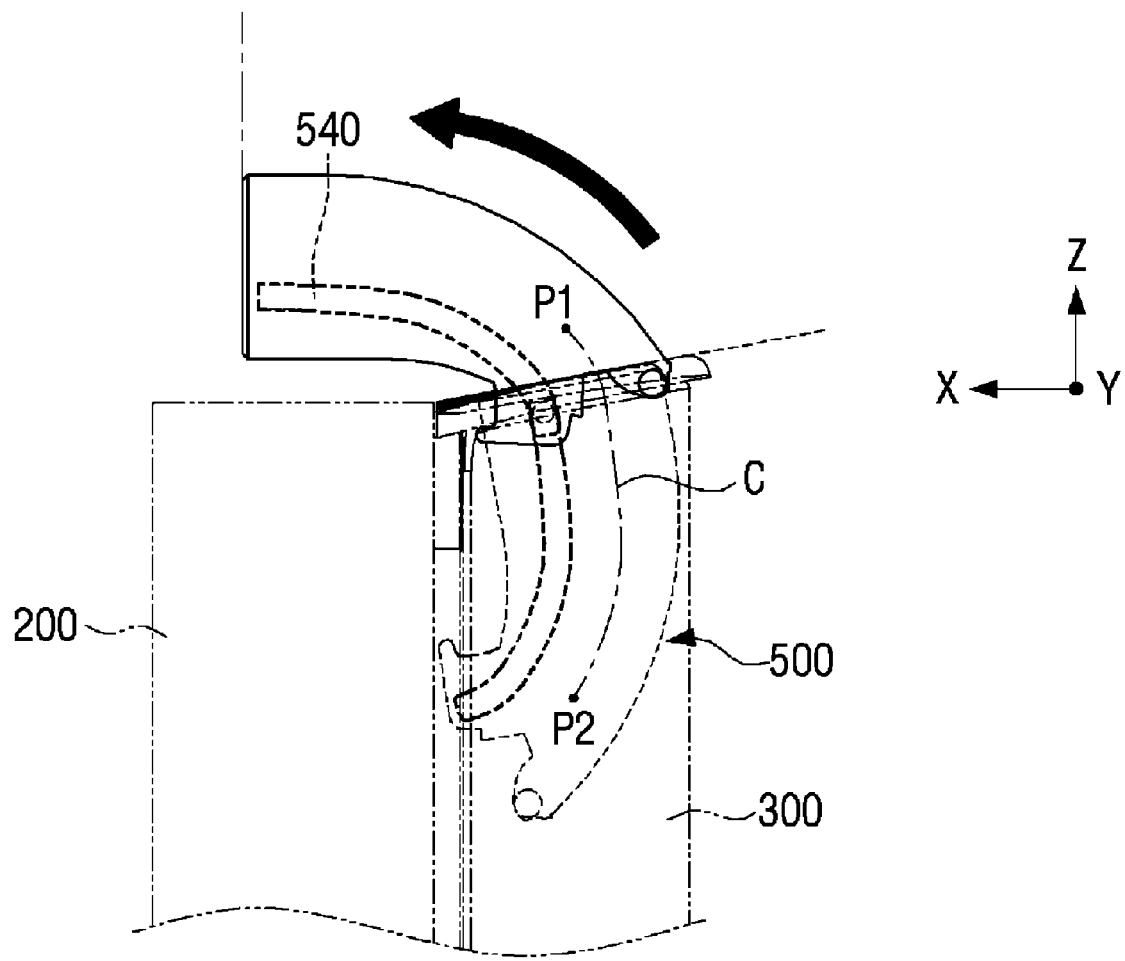
FIG. 16 is a view explaining a moving trace of a photographing unit when the photographing unit slides from a first position to a second position.

Referring to FIG. 16, through the sliding to follow the curved trace C, the photographing unit 500 moves from the first position to the second position and then projects out of the auxiliary casing 300. Here, the curved trace C corresponds to the shape of the slide guide groove 540 of the photographing unit 500 as described above with reference to FIG. 12. That is, the photographing unit 500 moves from the first position to the second position while drawing the curved trace C that corresponds to the shape of the slide guide groove 540.

At this time, a certain point of the photographing unit 500 moves along the curve or curved trace C that corresponds to the shape of the slide guide groove 540 from the position P2 in a state where the photographing unit 500 is arranged at the first position to the position P1 in a state where the photographing unit 500 is arranged at the second position. Other points of the photographing unit 500 may move in the same manner.

While the present disclosure has been shown and described with reference to certain embodiments thereof, it will be understood by those skilled in the art that various changes in form and detail may be made therein without departing from the spirit and scope of the present disclosure, as defined by the appended claims.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A display apparatus, comprising:
    a display main body configured to have an image display surface;
    wherein the display main body comprises a main casing configured to accommodate a display panel and an auxiliary casing mounted on a rear surface of the main casing; and
    a photographing unit configured to include a camera module that photographs a user to sense a user's gesture, the photographing unit being arranged at a first position where the photographing unit is accommodated inside the auxiliary casing during non-photographing and being arranged at a second position where the photographing unit projects out of the auxiliary casing during photographing,
    wherein the camera module is arranged closer to the image display surface if the photographing unit is at the second position rather than at the first position, and
    wherein the photographing unit moves from the first position to the second position or from the second position to the first position via sliding in a curve.

2. The display apparatus as claimed in claim 1, wherein the camera module is positioned to gaze at an upper plane parallel to an upper side of the display main body when the photographing unit is at the first position and is positioned to gaze at a front plane parallel to a front side of the display main body when the photographing unit is at the second position.

3. The display apparatus as claimed in claim 2, wherein the photographing unit further comprises a camera casing having a shape corresponding to the curve and including a pair of slide guide grooves spaced apart from each other for a predetermined distance, and
    the auxiliary casing provided with a pair of guide projections inserted into the pair of slide guide grooves to guide sliding of the camera casing.

4. The display apparatus as claimed in claim 3, further comprising a locking unit configured to lock the photographing unit at the first position in the auxiliary casing.

5. The display apparatus as claimed in claim 4, wherein the locking unit comprises:
    a latch unit connected to the photographing unit; and
    a locking member provided in the auxiliary casing to lock the photographing unit through engagement with the latch unit when the photographing unit is arranged at the first position.

6. The display apparatus as claimed in claim 5, wherein the latch unit comprises:
    a latch housing; and
    a pair of hook members configured to be movable between an exposure position for being exposed out of the latch housing and a partial insertion position for being partially inserted into the latch housing,
    wherein when the photographing unit moves from the second position to the first position, the pair of hook members move from the exposure position to the partial insertion position to be hook-engaged with the locking member, and when the photographing unit moves from the first position to the second position, the pair of hook members move from the partial insertion position to the exposure position to be separated from the locking member.

7. The display apparatus as claimed in claim 6, wherein the locking member comprises:
   a locking member main body portion extending vertically from the auxiliary casing; and
   an engagement portion provided at a front end of the locking member main body portion to be engaged with the pair of hook members,
   wherein the pair of hook members get elastically closer to each other to hook in the engagement portion when moving from the exposure position to the partial insertion position, and are elastically spaced apart from each other to be separated from the engagement portion when moving from the partial insertion position to the exposure position.

8. The display apparatus as claimed in claim 6, further comprising a slider having the latch unit mounted thereon and configured to be engaged with the photographing unit,
   wherein the slider slides downward to hook-engage the lock member with the hook member when the photographing unit moves from the second position to the first position, and when the hook member and the lock member are separated from each other, the slider slides upward to move the photographing unit from the first position to the second position.

9. The display apparatus as claimed in claim 8, further comprising a pair of guide rails provided on both sides of the slider to guide sliding of the slider.

10. The display apparatus as claimed in claim 9, further comprising an elastic member configured to press the slider upward when the hook member and the locking member are separated from each other.

11. The display apparatus as claimed in claim 10, wherein the elastic member is a torsion bar spring.

12. The display apparatus as claimed in claim 9, further comprising a damping member mounted on the slider to adjust a sliding speed of the slider.

13. The display apparatus as claimed in claim 12, wherein the damping member is provided as a rotating damper engaged with a damper rail provided on the guide rail to be rotated.

14. The display apparatus as claimed in claim 3, wherein the camera casing comprises:
   a base casing having the camera module mounted thereon and the pair of slide guide grooves formed thereon; and
   a cover casing configured to cover the base casing.

15. The display apparatus as claimed in claim 14, wherein the base casing is formed of an aluminum material.

16. The display apparatus as claimed in claim 1, wherein the photographing unit further comprises a tilt lever configured to adjust a tilt of the camera module.

17. The display apparatus as claimed in claim 1, further comprising at least one voice sensing unit mounted inside the display main body to sense a user's voice.

18. The display apparatus as claimed in claim 17, wherein the at least one voice sensing unit is mounted adjacent to an upper surface of the display main body and is provided on both sides of the photographing unit.

19. The display apparatus as claimed in claim 1, wherein the display apparatus is a television set.

\* \* \* \* \*